(12) United States Patent
Gandy

(10) Patent No.: US 12,089,579 B2
(45) Date of Patent: Sep. 17, 2024

(54) IMAGE EMITTING FISHING LURE

(71) Applicant: Jarvis Earl Gandy, San Diego, CA (US)

(72) Inventor: Jarvis Earl Gandy, San Diego, CA (US)

(*) Notice: Subject to any disclaimer, the term of this patent is extended or adjusted under 35 U.S.C. 154(b) by 78 days.

(21) Appl. No.: 17/951,998

(22) Filed: Sep. 23, 2022

(65) Prior Publication Data
US 2023/0100338 A1 Mar. 30, 2023

Related U.S. Application Data

(60) Provisional application No. 63/248,412, filed on Sep. 24, 2021.

(51) Int. Cl.
*A01K 85/01* (2006.01)
(52) U.S. Cl.
CPC .......... *A01K 85/011* (2022.02); *A01K 85/015* (2022.02)
(58) Field of Classification Search
CPC .... A01K 85/01; A01K 85/011; A01K 85/012; A01K 85/013; A01K 85/015
See application file for complete search history.

(56) References Cited

U.S. PATENT DOCUMENTS

| | | | | |
|---|---|---|---|---|
| 515,001 A | * | 2/1894 | Lamb | A01K 85/16 43/42.32 |
| 2,864,195 A | * | 12/1958 | Bachmann | A01K 79/02 43/4.5 |
| 3,210,882 A | * | 10/1965 | Purdom | A01K 85/16 D22/133 |
| 4,787,167 A | * | 11/1988 | Wroclawski | A01K 85/01 43/42.32 |
| 4,888,904 A | * | 12/1989 | Douglas, Jr. | A01K 85/01 43/17.6 |
| 5,414,951 A | * | 5/1995 | Martin | A01K 91/00 43/17.5 |
| 8,240,078 B2 | | 8/2012 | Hawryshyn | |
| 2004/0237364 A1 | * | 12/2004 | Henry | G09F 9/33 40/544 |
| 2005/0252069 A1 | | 11/2005 | Pool | |
| 2011/0099882 A1 | * | 5/2011 | Young | A01K 85/01 43/17.6 |
| 2013/0333270 A1 | * | 12/2013 | Castaneda | A01K 85/01 43/42.31 |
| 2015/0201592 A1 | * | 7/2015 | Senter | A01K 85/01 43/17.6 |
| 2015/0366178 A1 | | 12/2015 | Bechhold | |

FOREIGN PATENT DOCUMENTS

WO WO-0004769 A2 * 2/2000 ............. A01K 75/02

* cited by examiner

*Primary Examiner* — Richard G Davis
(74) *Attorney, Agent, or Firm* — LeJeuna Law, P.C.; Cody LeJeune

(57) ABSTRACT

A device to be used as a lure in fishing, hunting, and other activities to emit an image or hologram of a bait. The image source can consist of a device such as a laser-beam, projector, or light through fiber optics cables. The invention can display the desired shape or color chosen by the user via an optional wirelessly connected controller.

12 Claims, 4 Drawing Sheets

IMAGE EMITTING FISHING LURE

CROSS-REFERENCE TO RELATED APPLICATION

This application claims benefit of priority to U.S. Provisional Application No. 63/248,412, filed on Sep. 24, 2021, entitled "Image Emitting Fishing Lure," the entire disclosure of which is incorporated by reference herein.

FIELD OF THE DISCLOSURE

This application relates to fishing lures.

BACKGROUND

Since the dawn of man, fishing has been an essential part of food gathering. Today, fishing is also a sport. To become more effective, fishing lures have been customized to attract certain types of fish local to an area. Some of these lures attract lake fish, while others attract sea fish that may be more attracted to luminescence. The type of fish dictates which lure will be needed, requiring numerous types of lures to serve different purposes.

In many situations, replacing the lure requires long and tedious efforts when fishing. In addition, the fisherman must retrieve the fishing line every time a new lure is needed; this constitutes a loss of time and prey-catching opportunities.

There is a need for a lure that provides higher visibility at deep levels. Most reflective lures rely on the reflection of the sun and in consequence, are not effective at deeper water levels.

There is a need for more effective and efficient lures. A need to make them more environmentally friendly and reduce the impact in the environment.

Although there are lures that emit light, there is a need for a more sophisticated lure to increase efficiency and attraction, and that may be reconfigured without recasting. This will reduce the effort and time of reeling the lure in and recasting, giving the fisherman multiple options without having to change lures.

SUMMARY OF THE INVENTION

The present invention overcomes these and other disadvantages of the prior art by providing an image-generating lure that can be reconfigured on the fly. In an embodiment of the invention, the lure comprises a light emitting diode or laser optically coupled to a beam splitter that passes one of a plurality of predetermined images through one or more lenses to emit an attractive image. The predetermined images are depictions of natural prey for various types of fish. For example, the images may represent fish, crayfish, and frogs to lure adult largemouth bass. The images may further represent squid, shrimp, or eels to lure bluefin tuna. Depending on the fisherman's objective, a particular image is selected for display. If the objective is catching tuna, an image of a shrimp or squid would be selected rather than a frog. The image is selected to attract the desired catch. The lure further includes a wireless transceiver such as a Bluetooth or Wi-Fi transceiver for communicatively coupling the lure to a controller such as a smartphone. The smartphone includes an app or user interface to permit a user to select an image from a plurality of preselected images. This permits the user to reconfigure the lure's image even without reeling the lure back in after a cast.

The Image Emitting Fishing Lure was developed to rely on a single accessory that can reproduce multiple types of bait images with multiple colors. When achieving its purpose, users can rely on a single device for various purposes and fish types without the need to have different lure accessories. Thus, the user can display his desired bait shape and color without replacing the lure near the fishing hook.

The Image Emitting Fishing Lure mitigates the need to change the lure every single time and allows the user to control the light emitted image from the fishing pole. This means that no retrieving is needed, and the user can simply change the light emitted image and/or colors of the display to attract the desired specimen through the wireless control at the fishing pole or smart phone.

Compared to other bait accessories in today's market, the light emitted image produced by the present invention provides higher visibility at deep levels since it does not depend on the reflection of the sun. Given that the device emits its own light, it permits the user to reach deeper levels and still have high visibility.

The Image Emitting Fishing Lure—besides being more effective and efficient than common baits and lures—is eco-friendly. Due to the reduction of accessories required by the user, there less environmental impact from the use of the present invention.

The present invention can be used for fishing, hunting, or other activities. The present invention dramatically improves the versatility of using one lure to fishing or hunting different animals. Thus, there is a desire and need for this technology. The ability to interchange the emitting light projection or combination of colors to attract different animals saves a lot of time, reduces waste, and makes the sport or recreational activity more efficient.

In some embodiments, the emitted light consists of a laser beam diffracted to create the illusion of an image. In some embodiments, the laser beam passes through a filter that diffracts the laser beam and displays an image.

In other embodiments, the emitted light consists of a compact projector. The projector can emit images and video. Depending on certain conditions and the reflective environment, the projector can display a bait in the form a hologram. For example, the holograms can portray images of fish, animals, or other bait or fishing lures. Common baits that can be displayed by the Image Emitted Fishing Lure are worms, leeches, minnows, insects, and other types of fish. This holographic display can be still or a video.

For hunting, the present invention can be attached to a gun, trees, branches, other places in nature, or deployed at ground level. For hunting, the present invention can display small rodents, insects, and other small animals.

In other embodiments, the emitted light passes through a one or more fiber optic cable. The one or more fiber optic cable can be shaped to represent different objects, baits, lures, or animals.

The container or casing in which the projection occurs can differ in sizes depending on the activity. For example, for fishing, the device would be in a size of a fishing lure. For hunting, the container would be in the form of gun barrel attachment. The container could also be attached and deployed at ground level or attached to branches or other places in nature.

In certain embodiments, the present invention is comprised of a laser beam emitter, means for powering up the beam emitter, means for operating the laser beam emitter, means for connecting the present invention and attaching it to other objects, a filter to diffract a laser beam and generate an image, and a water-proof casing to protect the components of the present invention.

In other embodiments, the present invention is comprised of a projector, means for powering the projector, means for operating the projector, means for connecting the present invention and attaching it to other objects, a lens to process a projected image generated by the projector, and a water-proof casing to protect the components of the present invention.

In other embodiments, the present invention is comprised of a light emitter, means for powering the light emitter, a one or more fiber optic cable, a means for operating the light emitter, a means for connecting the light emitter to the one or more fiber optic cable, and a water-proof casing.

In certain embodiments, the device is controlled wirelessly via a remote control or a phone app. The phone app is able to control and change the images, holographic displays (including images and holograms of baits and/or prey). The user can alter and modify the image or hologram, such as its color, size, and shape. The user can also use different methods to establish connection/communication with the Image Emitting Fishing Lure, such as Bluetooth, WI-FI, RF-signal, and other signals as well.

In other embodiments, the device can be used for decoy, for example, displaying the image of military equipment in warfare. The images produced by the device can be used to study equipment in a holographic form for purposes of getting familiar with the equipment or for research purposes.

The foregoing and other features and advantages of the invention will be apparent from the following, more particular description of the invention's preferred embodiments, the accompanying drawing, and the claims.

BRIEF DESCRIPTION OF THE DRAWINGS

For a more complete understanding of the present invention and advantages thereof, reference is now made to the ensuing descriptions taken in connection with the accompanying drawings briefly described as follows.

Figure 1:
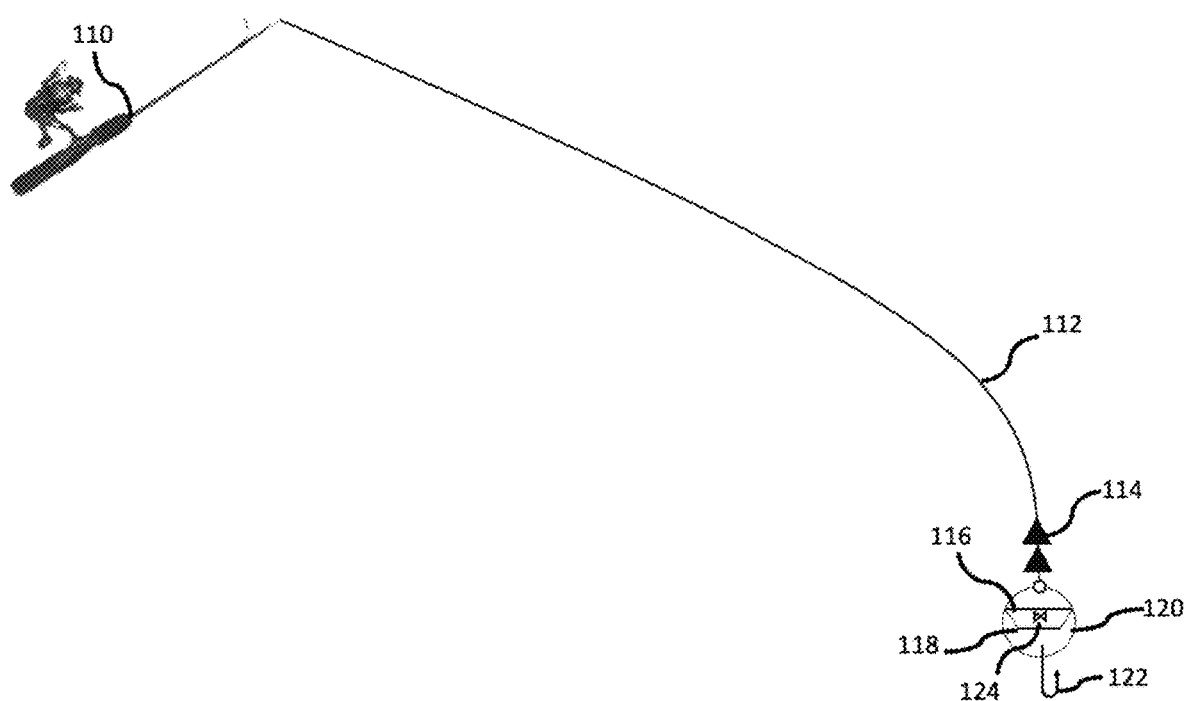
FIG. 1 shows an overview of the fishing rod with fishing reel, fishing line, image emitted fishing lure, and hook.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF PREFERRED EMBODIMENTS

The following detailed description is merely exemplary in nature and does not limit this disclosure or the application and uses of the invention. As used here, the word "exemplary" means "serving as an example, instance, or illustration." Thus, any embodiment described here as "exemplary" is not necessarily to be construed as preferred or advantageous over other embodiments. Furthermore, there is no intention to be bound by any expressed or implied theory presented in the preceding technical field, background, brief summary, or the following detailed description. Although the invention is described in the context of a fishing lure, the term lure includes any type of artificial bait including but not limited to swim baits and smart baits, as well as a combination of artificial and natural baits.

Described here are a device that allows a user to control an image emitted fishing lure for fishing, hunting, and other activities.

Preferred embodiments of the present invention and their advantages may be understood by referring to FIGS. 1-4 wherein like reference numerals refer to like elements FIG. 1 is a high-level drawing depicting the components of a preferred embodiment fishing pole deployed. The fishing pole 110 contains the Bluetooth system that controls the wireless signal directed to the projector 118. The system is connected to the fishing pole 110 through the fishing line 112, which has weights 114 to allow the system to sink in the water. When the system is immersed sufficiently deep, the operator can trigger a signal to activate the projector 118. This projection will be reflected in the video plate 116 and the capsule 120 to create the light emitted bait image 124. This will result in the intended purpose of attracting the prey towards the light emitted bait image 124 and to get caught in the fishing hook 122. In some embodiments the device contains a transceiver to receive data from a wireless controller. Such data can contain commands to control the device, such as turning on/off and rotating through a set of images stored in an storage component of the device or stored in the smart phone controller or remote controller. Images and video can be stored in the storage component, as well as downloaded into a phone app and transmitted to the device wirelessly.

Figure 2:
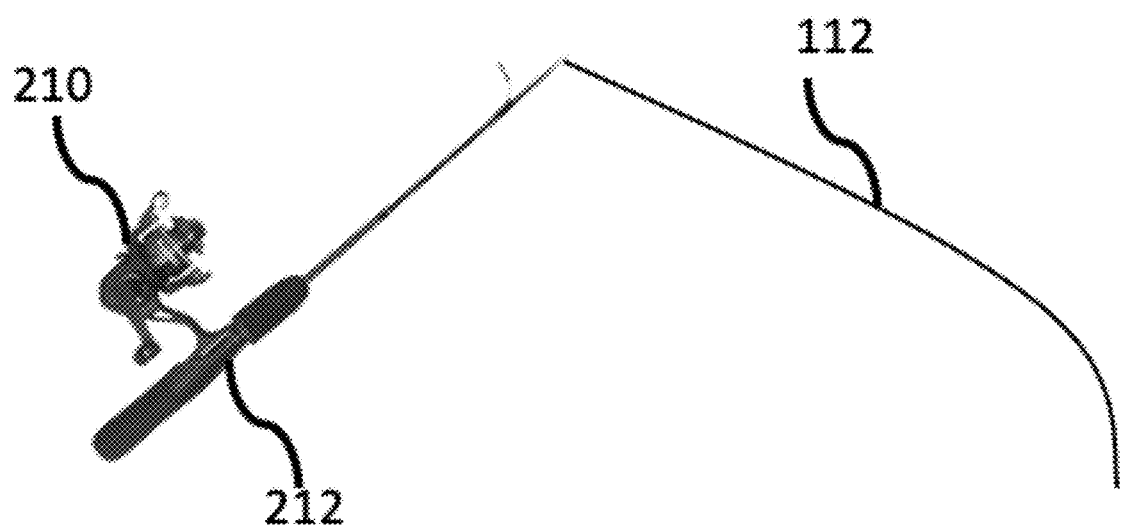
FIG. 2 shows a zoom in portion of the fishing rod, fishing reel, and remote controller.

FIG. 2 is a high-level drawing depicting the components of a preferred embodiment fishing reel. The fishing reel 210 is attached to the fishing pole, where the fishing line 112 is displaced towards the water. The remote controller or fishing app controller 212 is attached to the fishing reel 210. The purpose of the control location is to allow the operator to manage the image displayed while moving downward or upward the fishing line 112 from the fishing reel 210.

Figure 3:
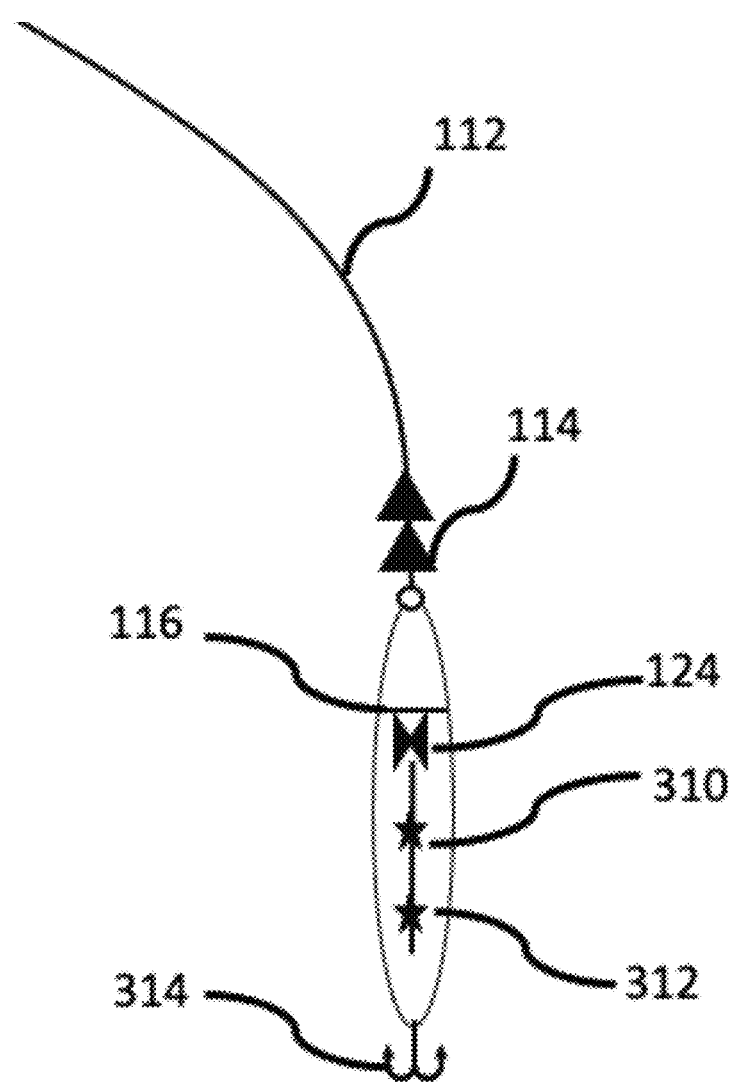
FIG. 3 shows a zoom in portion of the image emitted fishing lure.

FIG. 3 is a high-level drawing depicting the components in a preferred embodiment baiting system. The baiting system is attached to the fishing pole through the fishing line 112, which contains weights 114 to allow the system to sink. The video plate 116 displays an image/laser that creates the light emitted bait 124 and attracts prey towards the fishing hooks 314. The system has auxiliary physical baits 310 and 312 to increase the attraction towards prey.

Figure 4:
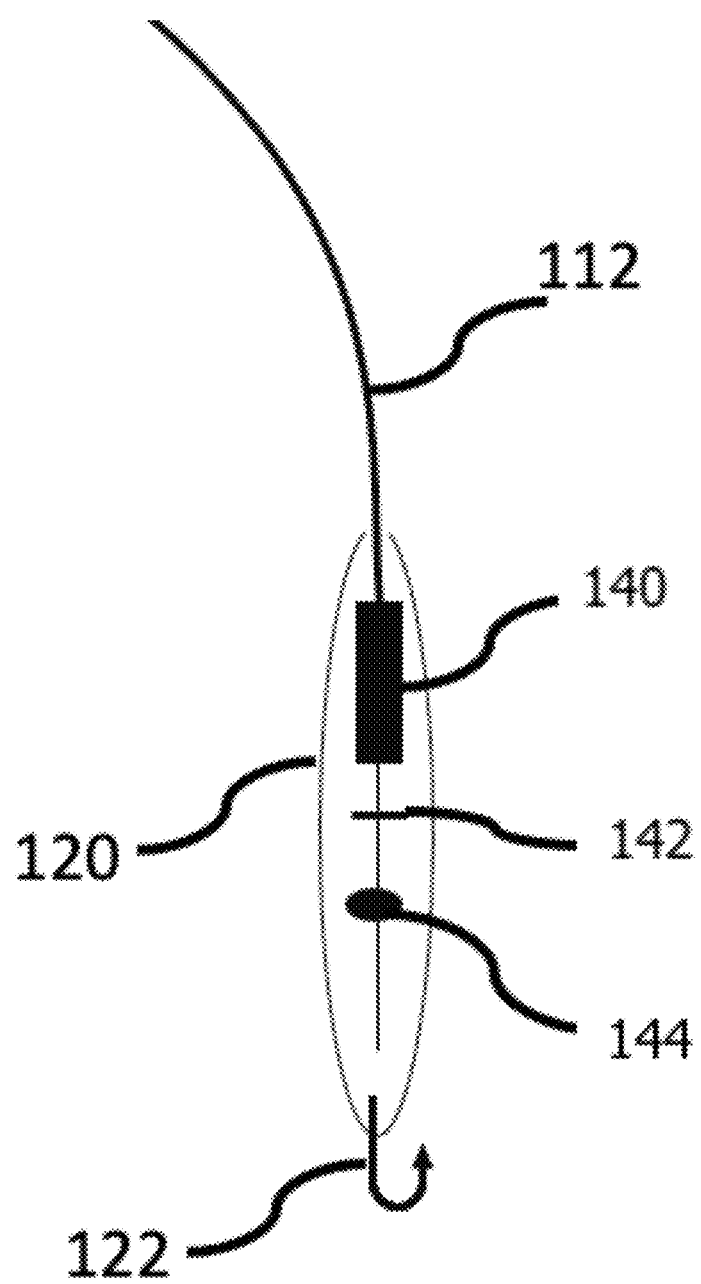
FIG. 4 shows a zoom in portion of a preferred embodiment's electronic components.

FIG. 4 is a high-level drawing depicting the components in a preferred embodiment baiting system in a different set-up with same purpose. The system is connected to the fishing pole through the fishing line 112. The capsule lair 120 contains a light/laser emitting device 140 that directs the light/laser through a beam cap/pattern/image 142 which reflects towards the lens/acrylic window 144 to display the light emitted image. The light emitted image attracts bait towards the fishing hook 122 to get caught.

What is claimed is:
1. An image emitting fishing lure device comprising:
a hologram source, and
a power source, wherein the hologram source displays motion without the need to change a viewing angle.

2. The fishing lure of claim 1, further comprising memory storage comprising a plurality of image files to display as a hologram.

3. The fishing lure of claim 2, further comprising a controller to select one of the plurality of image files, wherein the plurality of image files comprise images of natural prey.

4. The fishing lure of claim 1, further comprising a wireless transceiver.

5. The fishing lure of claim 4, wherein the controller is electronically coupled to the wireless transceiver.

6. An image emitting fishing lure system comprising:
   a hologram source, which can display motion without the need to change a viewing angle;
   a power source; and
   a controller.

7. The system of claim 6, further comprising memory comprising a plurality of image files.

8. The system of claim 6, further comprising a wireless transceiver.

9. The system of claim 8, wherein the controller is electronically coupled to the wireless transceiver.

10. The system of claim 9, further comprising a fishing rod.

11. The system of claim 9, wherein the controller consists of an app in a mobile phone.

12. The system of claim 10, wherein the controller is integrated into the fishing rod.

\* \* \* \* \*